United States Patent [19]

Rinde

[11] 4,325,737
[45] Apr. 20, 1982

[54] METAL-DOPED ORGANIC FOAM

[75] Inventor: James A. Rinde, Livermore, Calif.

[73] Assignee: The United States Department of Energy, Washington, D.C.

[21] Appl. No.: 197,465

[22] Filed: Oct. 16, 1980

Related U.S. Application Data

[62] Division of Ser. No. 26,505, Apr. 3, 1979, Pat. No. 4,261,937.

[51] Int. Cl.$^3$ .............................. C08L 1/12; C08L 1/08
[52] U.S. Cl. .................................... 106/122; 106/194; 521/61; 521/63; 521/92; 521/125; 521/149
[58] Field of Search ................. 521/61, 92, 63, 125, 521/149; 106/122, 194

[56] References Cited

U.S. PATENT DOCUMENTS

| | | | |
|---|---|---|---|
| 2,746,958 | 5/1956 | Pyle | 106/194 |
| 3,133,137 | 5/1964 | Loeb et al. | 106/194 |
| 3,574,803 | 4/1971 | Allen et al. | 106/122 |
| 4,012,265 | 3/1977 | Rinde | 106/122 |
| 4,261,937 | 4/1981 | Rinde | 521/92 |

*Primary Examiner*—Morton Foelak
*Attorney, Agent, or Firm*—L. E. Carnahan; Roger S. Gaither; J. E. Denny

[57] ABSTRACT

Organic foams having a low density and very small cell size and method for producing same in either a metal-loaded or unloaded (nonmetal loaded) form are described. Metal-doped foams are produced by soaking a polymer gel in an aqueous solution of desired metal salt, soaking the gel successively in a solvent series of decreasing polarity to remove water from the gel and replace it with a solvent of lower polarity with each successive solvent in the series being miscible with the solvents on each side and being saturated with the desired metal salt, and removing the last of the solvents from the gel to produce the desired metal-doped foam having desired density cell size, and metal loading. The unloaded or metal-doped foams can be utilized in a variety of applications requiring low density, small cell size foam. For example, rubidium-doped foam made in accordance with the invention has utility in special applications, such as in x-ray lasers.

2 Claims, No Drawings

METAL-DOPED ORGANIC FOAM

BACKGROUND OF THE INVENTION

The invention described herein was made at the Lawrence Livermore Laboratory in the course of, or under Contract No. W-7405-ENG-48 between the University of California and the U.S. Department of Energy.

This is a division of application Ser. No. 26,505, filed Apr. 3, 1979, now U.S. Pat. No. 4,261,937 issued Apr. 14, 1981.

The invention relates to low-density microcellular foams, and more particularly to metal-doped low density microcellular foams and method of fabricating same.

Various types of foams are known in the art. Foams such as polystyrene, polyurethane, polyethylene, etc., can be obtained in low densities between $0.01-0.1 \times 10^3$ kg/m$^3$, but with a cell size of the range from 25-200 $\mu$m. Also, foams have been reported in the published literature that have cell sizes of a few micrometers, but have high densities. More recently foams have been developed having a cell size of not greater than 2 $\mu$m and a density of $0.065-0.6 \times 10^3$ kg/m$^3$ for encapsulation of inertial confinement targets, as exemplified by U.S. Pat. No. 4,012,265 to J. A. Rinde, issued Mar. 15, 1977.

SUMMARY OF THE INVENTION

The present invention is directed to a low density, microcellular organic foams, either metal-doped or non-metal-doped (unloaded). The metal-doped foam fills the requirement for special applications, such as x-ray lasers, for example, wherein the foam must have a density of 0.025 to 0.4 gm/cm$^3$, a cell size of 2-10 micrometers ($\mu$m), and a metal loading from about 0.001 up to about 1.0 gm of metal salt per cm$^3$ of foam. The method of the invention for producing the metal doped foams is carried out by soaking a polymer gel having the desired density and cell size characteristics in an aqueous solution of the desired metal salt successively soaking the thus soaked gel in a solvent series of decreasing polarity to remove water from the gel and replacing it with a solvent of lower polarity, each solvent in series being saturated with the desired metal salt and miscible with the adjacent solvents used in the series, and removing the last of the solvents from the gel by freezing and then vacuum freeze-drying to produce the desired metal-doped foam. For example, a polymer gel is soaked in an aqueous solution of rubidium fluoride (RbF) and thereafter soaked in a series of solvents composed of rubidium fluoride saturated methanol, acetone, and benzene, whereafter the benzene was removed from the gel by freezing the gel in pentane and the residual benzene was removed by sublimation in a vacuum freeze-dryer, which yielded a rubidium-doped foam having the desired densitly, cell size, and metal loading. X-ray measurements of metal-doped foam of the invention have shown a uniform continuous distribution of the metal throughout the foam. The invention also encompasses a method for producing an unloaded form which can be formed from a selected polymer solution and processed similarly to the metal-doped foam process except for the impregnation of the metal salt.

Therefore, it is an object of this invention to provide a low-density, microcellular foam.

A further object of the invention is to provide a metal-doped foam of selected density, cell size, and metal loading.

A still further object of the invention is to provide a metal-doped foam having a density of 0.05 to 0.4 gm/cm$^3$, a cell size of 2 to 10 micrometers, and a metal loading of about 0.001 up to about 1.0 gm of selected metal salt per cm$^3$ of foam.

Another object of the invention is to provide a method for producing a low density microcellular foam, either metal-doped or unloaded.

Another object of the invention is to provide a method for producing a metal-doped foam wherein a polymer gel capable of producing a foam of selected density and cell size is soaked with an aqueous solution of the desired metal salt; removing water from the metal salt soaked gel by a series of successive solvent soaking operations, each solvent in series being saturated with the desired metal salt, miscible with the preceding solvent, and having a lower polarity; and thereafter removing the solvent from the gel to produce the desired metal-doped foam.

Other objects of the invention will become readily apparent to those skilled in the art from the following description.

DETAILED DESCRIPTION OF THE INVENTION

The present invention is directed to metal doped and non-metal-doped organic foams and to a method for producing such foams. As pointed out above, a need exists for metal-doped foams having both low density and very small cell size. The foams of the invention having a density of about 0.05 to 0.4 gm/cm$^3$ and a cell size of less than 1 to 10 micrometers, while the metal-doped foams tested additionally have a uniform metal distribution throughout the foam of up to 0.20 gm of metal per cm$^3$ of foam. Under certain conditions, metal distribution may be as high as 1.0 gm/cm$^3$ of metal to foam.

While the following specific description of the method is directed producing a specific type of foam and to producing cylinders or rods of rubidium-doped foams, to set forth an example for carrying out the invention, it is not limited to this specific foam or configuration thereof, or to the specific materials, solvents, or parameters set forth in the described example. The invention is applicable to foams incorporating other water-soluble metal salts, such as sodium chloride (NaCl) and potassium chloride (KCl). Also, polymer gel, prior to soaking same in an aqueous solution of the metal salt, may also be made by the process described and claimed in U.S. Pat. No. 4,118,449 issued Oct. 3, 1978 in the name of J. A. Rinde, utilizing cellulose acetate (CA), as well as by the method described hereinafter for producing the gel using the polymer polyacrylonitrile (PAN) having the composition $(C_3H_3N)_n$. It has been found by tests that for the production of metal-doped, low density, microcellular foams, the foams produced from PAN have a higher strength than the CA foams. Also, for applications utilizing larger cylindrical foam configurations, the PAN foams are preferred over the CA foams, the PAN foams producing, for example, uniform cylinders 0.5 to 3.0 mm in diameter and in any length practical to handle.

The PAN foams can also be produced with larger radial cells (up to 50$\mu$) that give added stiffness. The limiting factors of the foam for producing cylindrical configurations, for example, are (1) density of the foam without the water-soluble metal salt, (2) size of small uniform cells, (3) water-soluble metal salt density and uniform distribution, and (4) uniformity, straightness, and strength of the metal salt-loaded cylinders. However, the metal-doped foams made in accordance with the invention may be formed, molded, or extruded into various configurations, although the following description is directed to cylindrically configured foams.

The cell formation process by which the polymer solution is transformed into a polymer gel with a fixed cell structure is through solidification by spinoidal decomposition or by nucleation and growth. In spinoidal decomposition a polymer in solution solidifies to form an interpenetrating network—a gel. This may occur either in solution when long-chain molecules associate to form entanglement networks or when the solvent is evaporated to cause supersaturation (i.e., the equilibrium polymer-rich phase grows into the solvent phase). Because spinoidal decomposition occurs with diffuse boundaries (surfaces are not made) interpenetrating networks are foamed.

In cases where there is not enough supersaturation to cause phase separation, solidification may occur by nucleation and growth. The nuclei are supplied by the polymer-rich portion of the interpenetrating network. Growth takes place to form columnar structures and continues until the growth rate of the column exceeds the diffusion rate of the solvent. After a critical columnar length is reached, the growth rate decreases until the solvent diffusion rate reaches a high enough value to reinitiate the growth. However, because more time is required for the solvent to reach the new layer of polymer, the columns become longer and wider.

The above briefly described general processes have been observed in the formation of both CA and PAN foams. Spinoidal decomposition yields foams with uniform micrometer-sized cells; nucleation and growth yields foams with columnar cells. Either mechanism of polymer solidification can be selected by adjusting the solvent system and the temperature of solidification.

The process for making metal salt-loaded PAN cylindrical foams in accordance with the present invention consists of five basic steps:

(1) Preparation of the PAN solution.
(2) Molding or extrusion of a polymer gel rod.
(3) Soaking the gel rods in water-soluble metal salt solutions.
(4) Solvent transfer to remove water.
(5) Freeze drying.

Each step is discussed hereinbelow under separate headings.

(Step 1) CA Solution Preparation

As pointed out above, the metal-doped foams can be made from cellulose acetate (CA) gels produced in the manner described in above-referenced U.S. Pat. No. 4,118,449. However, it is understood that only the process steps through the water bath to diffuse out of the gel the solvents and swelling agents as described in U.S. Pat. No. 4,118,449 are utilized in the present process. The polymer gel thus formed is then utilized as in steps 3-5 above, provided that a solvent other than acetone be used in the transfer step since CA dissolves in acetone. The transfer step could also omit the use of acetone.

(Step 1) PAN Solution Preparation

For uniform, isotropic, micrometer-sized cells, the polymer solution must be close to precipitation. That is, the polymer must be dissolved in a solvent or solvent mixture that barely dissolves the polymer. When this solution is extruded into a nonsolvent, the polymer phases out of solution rapidly (spinoidal decomposition) and forms small, uniform, open cells. If the solvent used to prepare the polymer solution is too good (i.e., readily dissolves the polymer), columnar cells form by nucleation and growth. Operational sequences for making two different PAN solutions are set forth.

EXAMPLE I

Polyacrylonitrile $(C_3H_3N)_n$ (PAN) is dissolved in N,N-dimethylacetamide (DMA) to give a 2 to 5 wt.% polymer solution. The foam formed from this solution had a columnar cell structure, being formed by nucleation and growth, an example being density of 0.06 $g/cm^3$.

EXAMPLE II

PAN is dissolved in DMA to give a 3 wt.% polymer solution to which was added about 5 to 10% acetone. The addition of the acetone, a nonsolvent for PAN, reduces the solvent power of the DMA and changes the polymer solidification process from nucleation and growth, as in Example I, to spinoidal decomposition. The foam formed from this solution had very small diameter isotropic cells, density of 0.065 $g/cm^3$, for example.

Several variables can be adjusted to vary the foam cell size; the addition of acetone appears to be the most effective, although the temperature of the water bath during the extruding or molding step also affects the foam cell size.

In verification tests conducted, it was found that a 3 to 3.5 wt.% solution of PAN in DMA/acetone yields foams with densities of 0.05 to 0.06 $g/cm^3$, and foam cell sizes of less than 10 $\mu$m, generally 2-4 $\mu$m. Solutions of 2 wt.% PAN were too low in viscosity to extrude well. Solutions of 4 and 5 wt.% PAN were too viscous, making it difficult to prepare uniform solutions. Although solutions using 2 to 5 wt.% PAN can be utilized, depending on the processing thereafter. At the higher PAN concentrations, dimethylformamide is a better solvent than DMA because it yields less viscous solutions.

To prepare a 3 wt.% solution of PAN in DMA/acetone (Example II above), the following procedure was used. The polymer is dissolved in the DMA, with stirring, by heating the solution to 90° C. in a closed container (no air). Overheating resulted in polymer decomposition (evidenced by a brown solution) with a much lower viscosity. The solution is cooled to room temperature and the acetone is added slowly with stirring until the solution clouds and then clears with further stirring.

(Step 2) Molding or Extrusion of Polymer Gel Cylinders

Polymer gel cylinders were formed by both molding and extruding techniques described as follows:

The molding technique consists of filling a container, such as a glass tube (5 to 12 cm in length and 1 to 3 mm i.d.), with the polymer solution and sealing the open end with a plug of semi-permeable material, such as silicone rubber. The sealed container was immersed (preferably horizontally) in a water bath, such as a 50% methanol/water solution at room temperature for sufficient time to allow the methanol/water solution to diffuse through the semi-permeable plug into the polymer solution in the tube. By diffusion, water forces the polymer out of solution and a gelular cylinder is formed, this being by "phase separation" from the DMA solvent. It was found that the DMA had to be completely soluble in the methanol/water solution, otherwise the resulting foam had nonuniform cell size of larger than the desired dimensions. The polymer gel was then removed from the tube or container and soaked in pure water for several hours (0.5 to 3.0 hrs) depending upon thickness to remove residual solvents. This process has two drawbacks: (1) the diffusion time is long (several days to about 3 weeks) for complete separation, and (2) the gel diameter generally is irregular and thus only short pieces (3.0 to 6.0 cm) of uniform-diameter gel were obtained.

The extrusion technique for making the gel cylinders, involved several variations, including vertical and horizontal extrusion, different nonsolvents in the bath (generally water or methanol/water), different temperatures of the nonsolvent, and density gradients in the nonsolvent when extrusion is done in a vertical position which prevents excessive diametral necking of the gel rod caused by gravity pulling on the emerging polymer solution.

For vertical extrusion techniques, for example, the polymer solution is extruded from a container by gravity feeddown through a 3 mm i.d. glass tube into an 18-24 inch high column of methanol/water that has a density gradient of 0.935 gm/cm$^3$ at the top of the column to 1.000 gm/cm$^3$ at the bottom. In the preferred method, extrusion is carried out with the extrusion orifice in a horizontal position. The polymer solution is forced from the orifice under constant pressure into an 0° to 55° C. water bath or into a methanol water bath at a temperature of 0° to 50° C. and a density of approximately 0.94 g/cm$^3$. The apparatus and extrusion procedures are described in detail in report UCID-18007 entitled "Low-Density, Salt-Loaded Forms" by J. A Rinde bearing the date of Jan. 10, 1979. Basically, the apparatus utilized in the tests consisted of a container or tray containing a nonsolvent bath, a separating funnel fitted with a taper stopper and provided with a glass orifice, with a syringe pump supplying air at a constant pressure to the polymer solution contained in the funnel to produce a constraint driving force to expel the polymer solution from the orifice at a rate of 4 to 8 cm$^3$/min into the nonsolvent bath. As the polymer solution extrudes into the nonsolvent bath, it must be guided to form a straight cylinder and must be kept below the surface of the nonsolvent liquid surface. Because of surface tension effects, a small amount of of soap (a few drops of liquid, less than 0.5 ml) is added to the nonsolvent. Gel cylinders or rods of uniform diameter and lengths of 10-20 cm were extruded, although longer length could be produced, depending on the length of the nonsolvent bath. The cylinders are merely cut to the desired length while in the bath. The freshly extruded rods or cylinders float for 1 to 3 min. before sinking to the bottom of the bath and are allowed to soak in the nonsolvent for 0.5 to 2.0 hrs. to complete the polymer separation and to allow the solvent molecules to diffuse out. The soaking time is dependent on the diameter of the cylinder, the composition of the bath and the solvent used. The temperature of the bath (water or methanol/water) into which the polymer solution is extruded also affects the foam cell size. The thus produced cylinders or rods of polymer gel are then transferred to pure water for additional soaking for a time period of 0.5 to 4.0 hrs. Finally, the cylinders or rods are processed to remove the water and then frozen and freeze-dried to produce unloaded foams or processed as described in steps 3-5 below to produce metal salt-loaded foams.

(Step 3) Soaking Gel Rods in Water-soluble Metal Solutions

To impregnate the polmer gel cylinders or rods (CA or PAN) with water-soluble metal salt solutions, the rods are soaked in a solution of the desired metal salt (i.e., RbF, NaCl, KCl, etc.). Utilizing RbF, for example, the rods are soaked in an aqueous solution of RbF at a concentration of 0.03 to 0.2 g/cm$^3$ for a time period of 2 to 24 hours. Tests have been shown that using PAN gel rods in solutions of 0.05 g/cm$^3$ RbF yield RbF densities of 0.05 g/cm$^3$ in the final foam where salt is not lost in the solent transfer step (Step 4) and if shrinkage is minor.

(Step 4) Solvent Transfer to Remove Water

After the polymer gel rod or cylinder is impregnated with the water-soluble metal salt, such as RbF, it must be freeze-dried to produce a metal loaded low-density foam. If the gel rod is removed from the metal salt solution and directly frozen and freeze-dried, a high density, shrunken, and distorted rod is obtained. For example, using a PAN gel rod impregnated with RbF, a density of $>0.2$ g/cm$^3$ is produced in the rod. To produce a uniform, low-density foam (density of 0.05 to 0.2 g/cm$^3$), the water in the polymer gel (a polar liquid) must be replaced by a nonpolar liquid before freezing and freeze-drying. To best accomplish this the rod is soaked in a series of solvents of decreasing polarity, with each solvent being miscible with the adjacent solvents in the series and saturated wth the desired metal salt to prevent loss of the metal salt loading. The solvents used to remove the water is dependent on the type of polymer used to prepare the gel and the metal salt being loaded therein. For example, with an RbF impregnated PAN rod, prepared as described above in steps 1-3, the rod is first soaked in pure methanol (saturated with RbF) for a time period of 10 min. to 2 hrs., depending on the diameter of the rod, to replace the water with methanol without leaching RbF from the gel. Then in similar manner, the methanol is replaced with acetone (saturated with RbF) by soaking the rod for a similar time period, and thereafter the acetone is removed by soaking the rod in benzene (saturated with RbF) for a similar time period. (With CA gels, acetone must not be used, use another solvent or go from methanol directly to benzene.) Each of these solvents in the series is less polar than the previous one and is miscible with the solvents on either side. Also, the solvents must be saturated with the metal salt before the solvent transfer is begun. While the solubility of RbF, for example, in these pure solvents is low, it is significantly higher when water is present. This is the case, particularly when the gel rod is transferred from the RbF/water solution into the methanol.

The above solvent transfer process may be utilized to remove the water from the PAN gel without saturation of the solvents with the metal salt in applications for the foam without metal salt loading.

(Step 5) Freeze-Drying

The gel cylinders or rods, processed as above described in Step 4 are frozen and freeze-dried to produce the foam rods. Several methods of solvent removal other than freeze-drying have been attempted (e.g., air-drying), but all cause excessive shrinkage. In the preferred technique, the gel rods, either unloaded or loaded with metal salt, are removed from the benzene, or other low polar solvent used in step 4, and placed in V-shaped blocks to maintain straightness, and covered with a porous metal plate to prevent vertical distortion. The gel rod in the V-shaped block is then placed in a bath of hexanes, pentane for example, at $-50°$ to $-70°$ C. (benzene freezes at $+5°$ C.) for a few minutes (1.0 to 5.0 min) and then transferred to a vacuum freeze-dry chamber for 4 to 10 hours to complete the freeze-drying, with pressures of 5 to 60 $\mu$m Hg being used in the chamber. Residual benzene is removed from the frozen gel by sublimation in the vacuum freeze-dryer to yield the desired unloaded or metal salt-loaded foam. Above referenced report UCID-18007 illustrates various foams produced by the polymer gels when processed as described above in steps 1–5.

Unloaded PAN Foams

Utilizing the above-described foam fabrication process, but eliminating step 3 (soaking the polymer gel in metal salt solutions) and without metal salt saturation of the solvents in step 4, foams of PAN were prepared with densities ranging from 0.05 to 0.4 g/cm$^3$, although most of the foams had densities of 0.05 to 0.1 g/cm$^3$ only because this was the range of greater interest. Extruded foam cylinders or rods had diameters from 1 to 3.0 mm and molded foam rods had diameters from 0.5 to 2.2 mm. However, these diameters represent the range of foams produced, not the limits of the fabrication techniques. Also, the fabrication process, as pointed out above, is not limited to producing cylindrical shapes only, but the foam can be formed, molded, or extruded to a variety of configurations, such as thin sheets and square or rectangle cross-section members. Photomicrographs at magnifications of 65 to 10,000X have been made to verify the foam structure, examples being illustrated in above-cited report UCID-18007. It was clearly established that the use of different materials (PAN/DMA and PAN/DMA/acetone, for example) in producing the polymer solution and/or the composition of the bath (water and methane/water, for example) produced different density and cell structure. Also, as noted above, the temperature of the water bath or methanol/water bath into which the polymer solution was inserted also affected the foam cell size.

Metal-Doped PAN Foams

Utilizing the method described above, PAN foams with densities of 0.05 to 0.4 gm/cm$^3$ were loaded with 0.001 up to 0.20 g/cm$^3$ of water-soluble metals, exemplified by RbF which was of greatest interest. However, the metal loading may be up to about 1.0 gm/cm$^3$. The main concern in metal-doped foams are the metal salt concentration, the uniformity of its distribution, and the physical properties of the loaded foam (density and cell size). In tests conducted on RbF-doped foams, the concentration of RbF in the foam ranged from 8.4 to 81.5 wt.%; the actual RbF concentrations being confirmed by analytical chemistry, while distribution of RbF within the foam was determined by energy dispersive x-ray analysis.

Tests conducted on the PAN foams produced by the above-described method established that foams of a density of 0.05 g/cm$^3$, for example are soft, but difficult to handle, while strength increased rapidly with an increase in foam density. Also, it was found that the strength of foam with columnar cells is higher than that of foam with small isotropic cells. Also, it was found that RbF loaded foams became sticky and difficult to handle when exposed to ambient air for a period of time because RbF is deliquescent (i.e., it absorbs moisture on exposure to ambient air), and thus these forms need to be contained in a protective environment. For example, moisture absorption for foams containing 0.1 g/cm$^3$ RbF range from 10 to 20%.

As pointed out above, other water-soluble salts may be utilized in place of RbF, such as NaCl and KCl. The above-described process would be essentially the same utilizing either NaCl and KCl, with the solvent transfer of Step 4 using, for example, methanol, acetone, and benzene, each saturated with the desired salt, as the decreasing polarity solvents to remove the water from the gel.

It has thus been shown that the present invention provides a metal-doped, low density microcellular foam and method of fabricating same while providing a method for producing a nonmetal-doped foam during the process by elimination of one step in the process and modification of the materials utilized therein. Thus, the invention provides a foam having a density of 0.05 to 0.4 gm/cm$^3$ and a cell size of 2–10 m, and providing the low-density microcellular foam with metal loading from about 0.001 up to about 1.0 gm of metal salt per cm$^3$ of foam.

While particular embodiments, materials, and parameters have been set forth to describe the invention, modifications will become apparent to those skilled in the art, and it is intended to cover in the appended claims all such modifications as come within the spirit and scope of the invention.

What I claim is:

1. A metal-doped organic foam of cellulose acetate or polyacrylonitrile having a density in the range of about 0.05 to about 0.4 gm/cm$^3$, a cell size of about 2 to 10 micrometers, and metal loading of up to about 1.0 gm of metal per cm$^3$ of foam, said metal being selected from the group consisting of RbF, NaCl, and KCl.

2. The metal-doped foam defined in claim 1, wherein said metal salt is RbF.

* * * * *